United States Patent [19]

Murayama et al.

[11] 4,190,359
[45] Feb. 26, 1980

[54] COPIER DOCUMENT HANDLING SYSTEM

[75] Inventors: Yuichi Murayama; Terumasa Sugiyama, both of Ebina, Japan

[73] Assignee: Rank Xerox Limited, London, England

[21] Appl. No.: 972,162

[22] Filed: Dec. 21, 1978

[30] Foreign Application Priority Data

Mar. 8, 1978 [JP] Japan ............................ 53/28462[U]

[51] Int. Cl.² .................................................. G03B 27/62
[52] U.S. Cl. ........................................................... 355/75
[58] Field of Search ...................... 271/4, 233; 355/75, 355/76

[56] References Cited

U.S. PATENT DOCUMENTS

| | | | |
|---|---|---|---|
| 3,467,469 | 9/1969 | Hastings et al. | 355/75 X |
| 3,623,806 | 11/1971 | Short | 355/75 X |
| 3,726,589 | 4/1973 | Difulvio et al. | 355/75 X |
| 3,888,582 | 6/1975 | Griswold | 355/75 X |
| 3,994,582 | 11/1976 | Goshima et al. | 355/75 |
| 4,030,721 | 6/1977 | Kurosaki | 271/3 |
| 4,040,615 | 8/1977 | Kurosaki | 355/76 |
| 4,043,550 | 8/1977 | Phillips et al. | 271/4 X |

Primary Examiner—Donald A. Griffin

[57] ABSTRACT

A low cost original document handling apparatus for a copying machine for automatically discharging the original document from the platen after it has been copied. It is automatically driven for an electrically controlled time period by a helical spring drive system which automatically stores and subsequently utilizes the platen cover opening or closing force to eject documents and eliminate the cost and power consumption of a conventional electrically driven document drive system. It includes automatic over-winding protection. A dual function electromechanical release system automatically unlatches the platen cover after connecting the spring drive to eject the document.

5 Claims, 12 Drawing Figures

COPIER DOCUMENT HANDLING SYSTEM

The invention relates to an original document handling apparatus for use in a copying machine for automatically discharging the original document from the platen at the end of the copying operation with a drive mechanism utilizing the opening or closing action of the platen cover.

The difficulty of handling the original documents at a high copying speed has become a serious limiting factor with the increased speed of operation of copying machines. Various original document handling systems for copiers are known in the art, including those that automatically eject the document from the copying platen and raise the platen cover after copying is completed, such as that shown in U.S. Pat. No. 3,888,582. There is a conflicting design goal in that such units should be able to reliably and rapidly successively handle original documents of various sizes, weights, and thicknesses without damage, and without operator difficulty, and without interference with alternative manual document handling, yet they should also desirably be as low in cost as possible, particularly as compared to the copying machine itself, and consume as little additional electrical power as possible.

The present invention provides an inexpensive original document handling apparatus which can automatically discharge various kinds of original documents from the platen at the end of the copying operation and automatically open the platen cover, with a simple, low cost, low electrical power mechanism.

The above and other features of the present invention will be better understood from the drawings, wherein.

One example of the present invention will now be described in more detail with reference to the accompanying above-identified drawings.

As will be further explained herein, this exemplary original document handling apparatus disclosed in accordance with the present invention includes an opening and closing mechanism providing magnetic latching between the copying machine body 6 and the platen cover 7 and also automatic opening of the platen cover 7 when the magnetic latch is released, operating in combination with an original document discharging mechanism A in the platen cover 7 including a feed belt 14 for discharging the original document from the platen to the exterior; and a drive mechanism B therefor including helical spring driving means wound up, within limits, by movement of the platen cover during document loading or unloading. The discharging system A and its drive mechanism B are combined with an automatic releasing mechanism D in the platen cover for releasing the magnetic latch between the copying machine body 6 and the platen cover 7. A logic operation circuit including a solenoid release system and a connecting timing circuit controls the operation of both the original document discharging mechanism A and the automatic platen cover releasing mechanism D. The disclosed system is simple and inexpensive and can automatically discharge the original document from the platen after the copying operation is completed, reliably handling various kinds of original documents without damage thereto.

The disclosed embodiment is common in several respects to the document assist device disclosed in U.S. Pat. No. 3,888,582, over which it is an improvement as to the novel features disclosed and claimed herein. However, the present invention is not limited in application to this embodiment.

Figure 1:
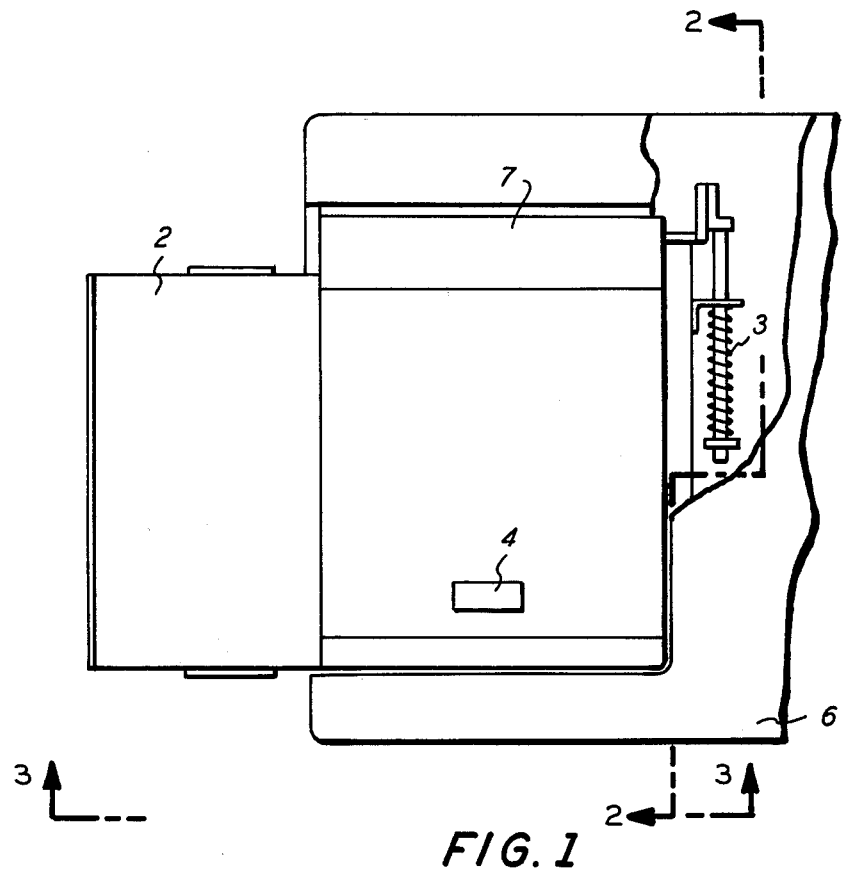
FIG. 1 is a plan view, partially broken away, showing one embodiment of an original document handling apparatus in accordance with the present invention on a conventional copy machine body, partially broken away.
Figure 2:
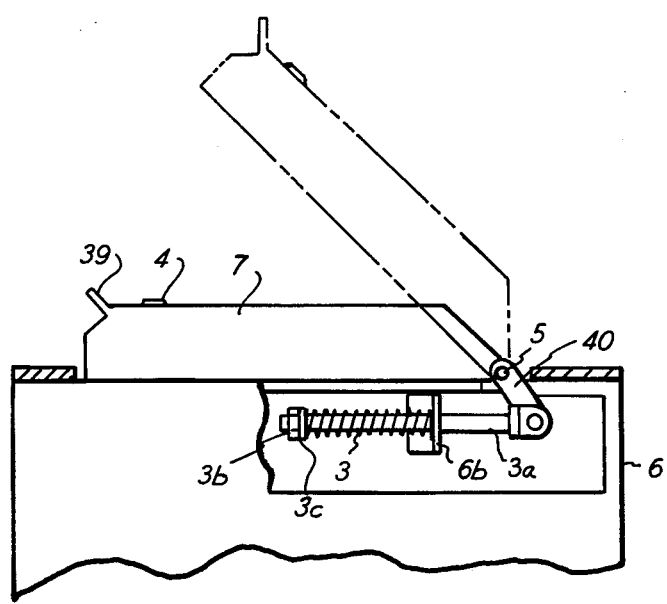
FIG. 2 is a cross-sectional view taken along the line 2—2 of FIG. 1.

As shown in FIGS. 1 and 2 a conventional copying machine body 6 pivotally supports a support shaft 5 along the rear of the platen cover 7 which is rotatably attached to a bracket on the copy machine body 6. An arm 40 is fixed to one end of the support shaft 5. A bracket 6b is fixed to the copying machine body 6 to support a rod 3a for reciprocating movement. The rod 3a is connected to the arm 40. The rod 3a has at one end a nut 3b and a spring stopper 3c. A balance spring 3 is interposed between the spring stopper 3c and the bracket 6b.

Figure 3:
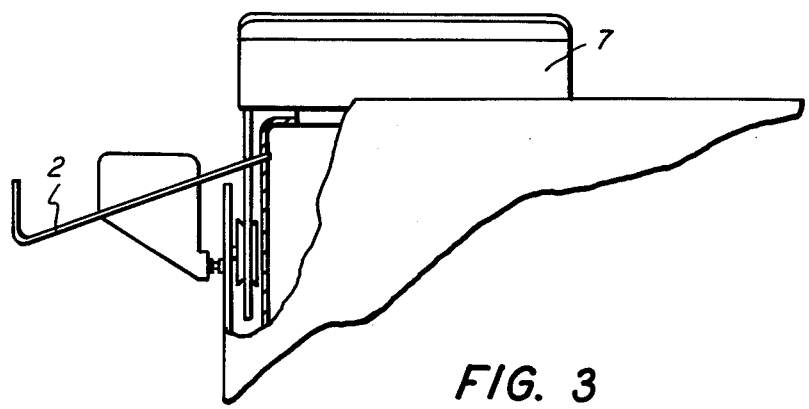
FIG. 3 is a partially broken away side view otherwise viewed along the line 3—3 of FIG. 1.

The platen cover 7 is formed at its front portion with a handle 39 and provided in the vicinity of, and in parallel to, the handle 39 with an elongated start switch 4 so that the machine operator can readily depress the start switch 4 while closing the platen cover 7 with one hand. The copying operation of the original document on the platen is started by actuation of the start switch 4 in the same manner as that of the conventional print switch (not shown) provided on the control board or console of the copying machine body 6. However, the start switch 4 is different from that print switch on the copying machine body 6 in that it additionally starts the following described operations at the end of the copying operation, including ejecting the original documents into an original document receiving tray 2 provided on the copying machine body 6 (Note FIG. 3).

Figure 4:
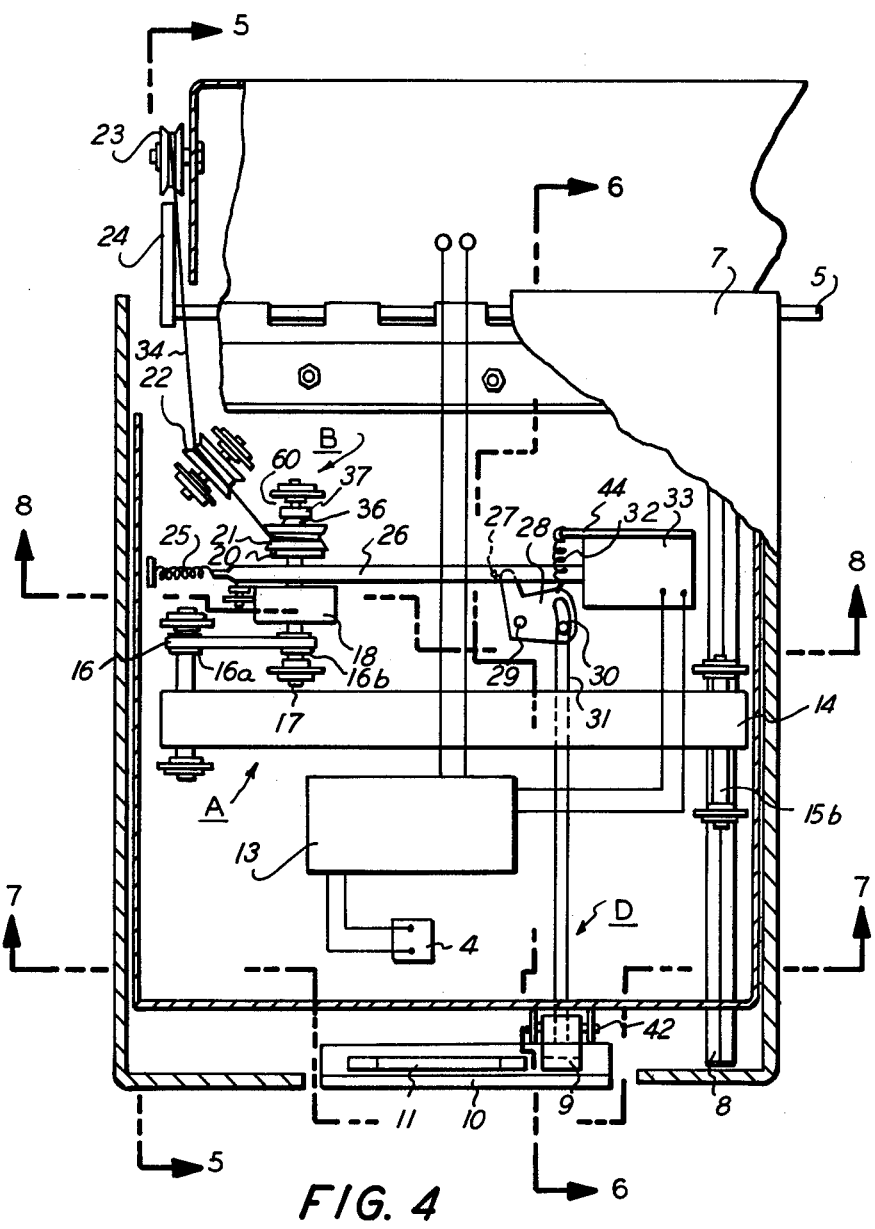
FIG. 4 is a broken away plan view of the original document handling apparatus.
Figure 5:
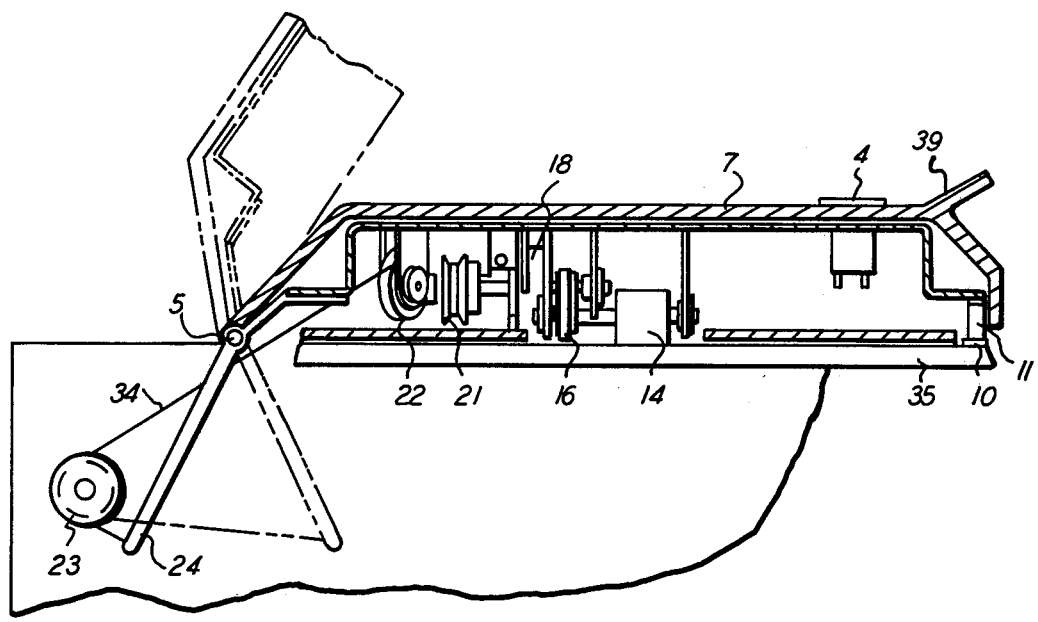
FIG. 5 is a sectional view taken along the line 5—5 of FIG. 4.
Figure 6:
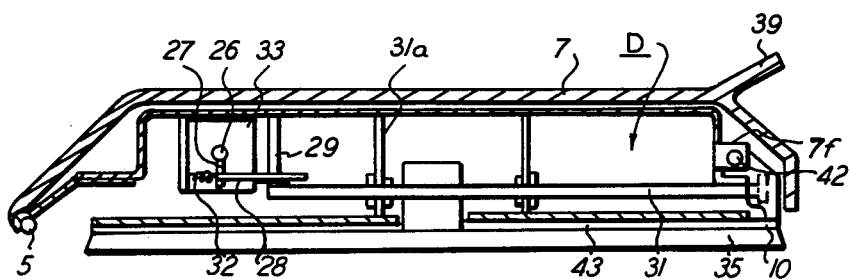
FIG. 6 is a sectional view taken along the line 6—6 of FIG. 4.
Figure 7:
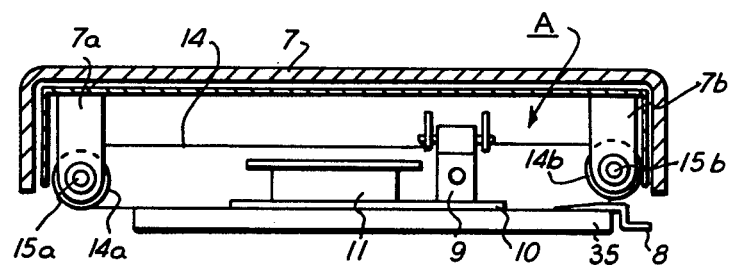
FIG. 7 is a sectional view taken along the line 7—7 of FIG. 4.

As shown particularly in FIGS. 4, 5 and 7, an original document discharging mechanism A is provided substantially centrally in the platen cover 7. As shown in FIG. 7, it includes shafts 15a and 15b rotatably mounted to the respective brackets 7a and 7b of the platen cover 7. The shafts 15a and 16b have thereon respective pulleys 14a and 14b around which a feed belt 14 is journaled. A pulley 16a is mounted on the shaft 15a as shown in FIG. 4. The feed belt 14 extends centrally across the platen but it is much narrower. As shown in FIG. 6, it extends through and below a slot in the lower surface 43 of the platen cover. The surface 43 is slightly spaced above the platen 35.

As shown, for example, in FIG. 4, a drive mechanism B is also provided in the platen cover 7, for driving the original document discharging mechanism A, which includes helical spring means 18. The inner or internal end of the helical spring 18 is engaged with a shaft 17 having thereon a pulley 16b. A timing belt 16 is journaled around the pulleys 16a and 16b to drivably connect shafts 15a and 17. A hub 20 is mounted to the shaft 17. A pulley 21 is adjacently rotatably mounted on the shaft 17 through an over-running clutch 60 shown exploded in FIG. 9. That is, the shaft 17 has thereon a leaf spring 36 and a ring 37 so that the pulley 21 is releasably attached to the hub 20. As shown in FIGS. 4 and 5, a guide pulley 22 is provided in the platen cover 7. An arm 24 is secured on the support shaft 5 and a pulley 23 is mounted on the copying machine body 6. A wire or cord 34 having one end attached to the arm 24 extends through the pulley 23 and the guide pulley 22 to the pulley 21.

Figure 8:
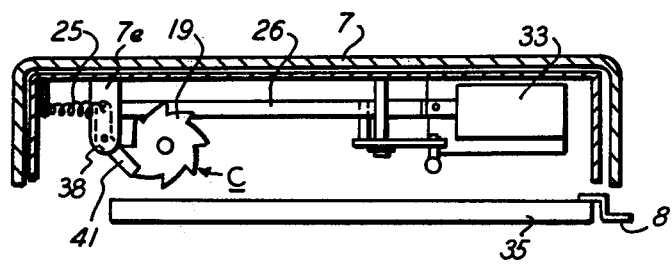
FIG. 8 is a sectional view taken along the line 8—8 of FIG. 4.

A stopper or escapement mechanism C, as shown in FIGS. 4 and 8, is drivingly connected to the helical spring means 18. It is in the platen cover 7 and includes a ratchet 19 drivingly connected to the helical spring 18. A pawl 41 engages the ratchet 19. The pawl 41 is pivotally mounted by a pin 38 to a bracket 7e of the platen cover 7 and is normally biased by a spring 25 into engagement with the ratchet 19 to allow winding, but prevent unwinding of spring 18. A solenoid 33 is provided in the platen cover to operate a rod 26 which has its end connected to spring 25 and ratchet 19 to release pawl 41 when the solenoid 33 is actuated against spring 25.

Provided at the front end of the platen cover 7 is a permanent magnet 11 slightly projecting from the lower surface 43 and an attraction plate 10 mounted to the copying machine body 6. The magnet 11 is attracted to the attraction plate 10 so as to provide magnetic latching between the platen cover 7 and the copying machine body 6. Since the magnet 11 is located on the front end of the platen cover 7, furthest from the center of rotation of the platen cover 7, the magnet 11 has the maximum leverage to hold the platen cover 7 closed against the force of the counterbalance spring 3 tending to lift the platen cover 7. However, the force of the spring 3 lifts the platen cover 7 automatically when the machine operator slightly lifts the platen cover 7 so as to separate the magnet 11 from the attraction plate 10.

An automatic opening mechanism D is provided in the platen cover 7, which includes a cam 9 rockably mounted to the bracket 7f of the platen cover 7 by means of a pin 42. One end of a shaft 31 is attached to the cam 9 for pivotal movement and movably supported by a support member 31a of the platen cover 7. As enlarged in FIGS. 10 and 11, a cam 28 is pivotally mounted by a pin 29 on the platen cover 7, and this cam 28 is formed with an elongated hole or slot 28a. A pin 30 is secured on the other end of shaft 31 and is engaged by the slot 28a. The cam 28 is biased by a spring 32 in the counter-clockwise direction.

Figure 12:
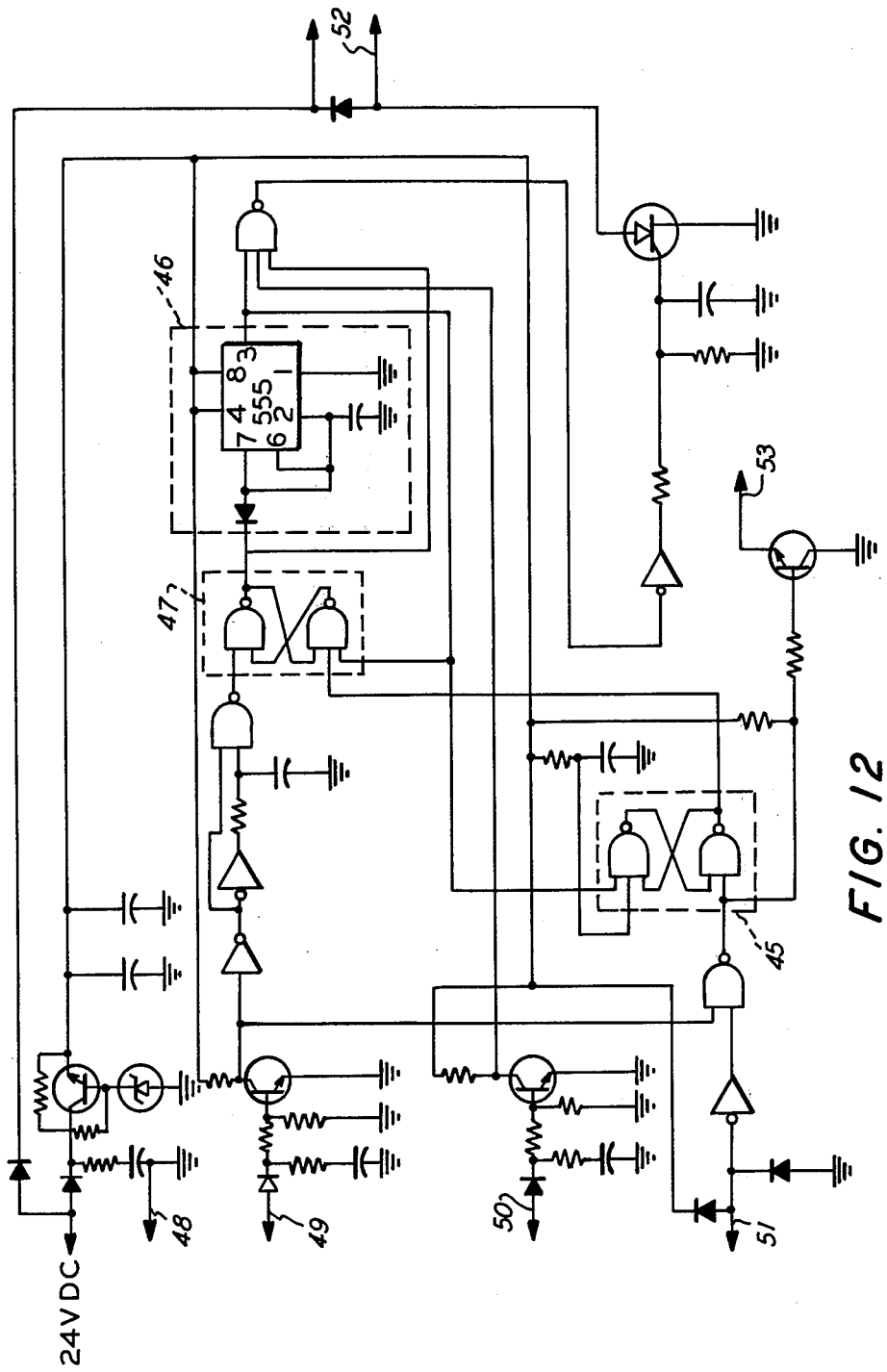
FIG. 12 is a circuit diagram of the logic circuit.

A logic operation circuit mounting 13 is provided in the platen cover 7 which contains a logic operation and timing circuit as shown in FIG. 12, including a latch circuit 45, a timer circuit 46, a timer start latch circuit 47, a power common or ground 48, an input 49 from a ready lamp, an input 50 from the copier run relay, an input 51 from the start switch 4, and output 52 to the solenoid 33, and an output 53 to the print switch provided on the copying machine body.

Pressing the start switch 4 sets the copying machine in operation. When the copying operation is completed, a copying operation end signal is delivered from the ready lamp. The copying machine produces another signal 50 from the run relay which is an inhibit signal for preventing the operation of the original document feed apparatus of the present invention except during the copying operation.

A brief description of the operation of the circuit shown in FIG. 12 is as follows: When the start switch 4 provided on the platen cover 7 is depressed, a copying operation start signal is produced and simultaneously the latch circuit 45 is set so as to set in its ready state the timer start latch circuit 47 for the timer circuit 46. When the copying operation is completed and the ready lamp goes on, the timer start latch circuit 47 is actuated so as to energize the solenoid 33. The time the solenoid 33 is held energized is pre-determined by a timer 555 and after that pre-determined time passes the solenoid 33 is de-energized and also the timer start latch circuit 42 and the latch circuit 46 return to their initial state in accordance with the output from the timer. If the print switch provided on the copying machine body is depressed the latch circuit 45 is not set and thus the timer circuit 46 remains non-operable so that the solenoid 33 remains de-energized.

The operator operation of the present system will now be further described. The machine operator opens the platen cover 7, if it is closed, by grasping the handle 39 and places the first original document to be copied in position on the platen. Then he or she closes the platen cover 7 and simultaneously depresses the start switch 4 to start the copying operation of the original document on the platen. No further operator action is required. After a pre-determined number of copies are produced from the original document, the original document is automatically discharged from the platen to the original document output tray 2 and the platen cover 7 is automatically lifted so that the next document can be placed on the platen. This is repeated for any subsequent documents to be copied.

The operation of automatically discharging the original document after the copying operation is completed is as follows: The logic circuit 13 responds to the copy operation end signal to energize the solenoid 33 as described above. This causes the rod 26 to move to the right so as to rotate the pawl 41 in the clockwise direction, whereby the engagement between the pawl 41 and the ratchet 19 is released and thus the helical spring 18 is freed. The length of time the solenoid 33 is held energized is controlled by the timer circuit 46 such that the feed belt 14 can completely discharge the original document on the platen, driven by the spring 18. When the helical spring 18 is so freed, it rotates the shaft 17, and the shaft 14a is rotated through the pulley 16b and the timing belt 16 and the pulley 16a to drive the feed belt 14 thereby discharging the original document from the platen to the original document output tray 2.

The helical spring 18 would be gradually unwound or loosened with repeated such operations, and eventually would not be able to provide the driving force to the feed belt 14, unless it was rewound. This is accomplished by the opening motion of the platen cover 7, which causes movement of the arm 25 to the position indicated by the dashed line in FIG. 5 and pulls the wire 34. The pulley 21 is rotated through the pulleys 23 and 22 by the tension of the wire 34 so as to wind up the helical spring.

Figure 9:
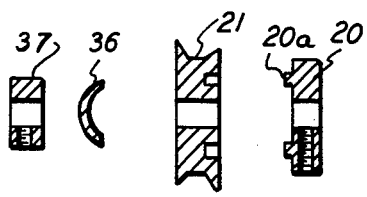
FIG. 9 is an exploded cross-sectional view used to explain the structure of the over-running clutch.

However, opening and closing motions of the platen cover 7 do not just occur only when the original document feed apparatus of the present invention is used. The cover is also opened and closed in other cases where the machine operator wants a normal copying operation without document ejection. In those cases the helical spring is not unwound, but is still wound up by the opening motion of the platen cover 7. If this were repeated until the helical spring 18 could not be further wound up, the wire 34 could be broken or the platen cover 7 held closed. This problem is overcome by the use of an overwinding protection clutch 60. The wire 34 engages pulley 21 at an angle, to apply axial as well as rotational force. When the helical spring 18 is wound up and the load torque of the shaft 17 and the tension on wire 34 becomes large, axial movement of the pulley 21 compresses the leaf spring 36 and releases the engagement between the projection 20a of the hub 20 and a normally mating recess in the pulley 21, all as shown in FIG. 9, whereby the hub 20 is freed to race and partially unwind the spring 18 until sufficient tension is released to allow re-engagement of pulley 21 and hub 20.

It will be appreciated that a regular spring loaded frictional slip clutch could be used instead, in which case the wire 34 could wrap normally on the pulley 21, by repositioning pulley 22.

Figure 10:
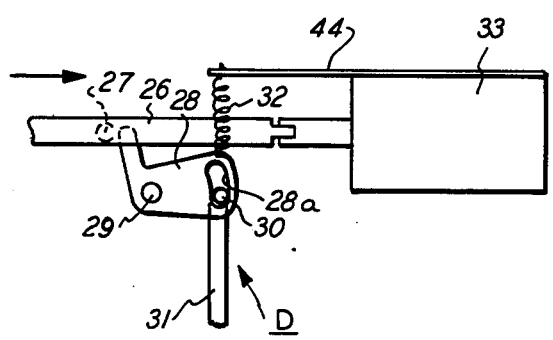
FIGS. 10 and 11 are partial enlarged views showing the operation of the cam of the automatic releasing mechanism.
Figure 11:
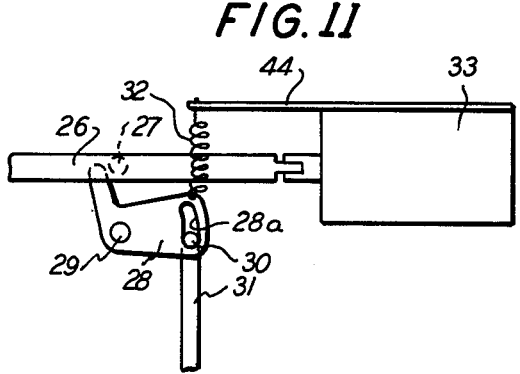

The automatic opening operation of the platen cover 7 is as follows: As shown in FIG. 10, when the solenoid 33 is energized, the rod 26 moves to the right so as to bring its pin 27 into contact with the projection of the cam 28 thereby rotating the cam 28 about its support shaft 29 in the clockwise direction. However, when the cam 28 is rotated in that direction its movement cannot be transmitted to pin 30, due to slot 28a, and with further movement of the solenoid 33 the pin 27 is released from (passes) the projection of the cam 28 so as to establish the relationship shown in FIG. 11. As noted above, when the solenoid 33 is energized, the pawl 41 also parts from the ratchet 19 to loosen the helical spring 18 so as to rotate the feed belt 14 thereby discharging the original document from the platen. The time required to discharge the original document is pre-determined in the logic operation circuit 13 and the solenoid 33 is de-energized after that time passes.

When the solenoid 33 is de-energized, the pawl 41 and the ratchet 19 are engaged again by the force of the spring 25 so as to stop the rotation of the feed belt 14. Further, the rod 26 is moved to the left by the force of the spring 25 so as to again come into contact with the projection of the cam 28, but from the opposite direction. This causes the cam 28 to now rotate in the opposite or counter-clockwise direction so as to pull the shaft 31 through the pin 30 engaged with the end of the slot 28a, thereby rocking the cam 9 to lift the platen cover 7. As a result, the magnetic lock between the magnet 11 and the plate 10 is released and thus the platen cover 7 is automatically opened by the force of the balance spring 3. When the solenoid 33 is completely de-energized, the pin 27 passes out of contact from the projection of the cam 28 and returns to the position shown in FIG. 10.

While the above-described embodiment is preferred, it will be appreciated that numerous variations and other embodiments are within the skill of the art, and it is intended to cover all those that fall within the true spirit and scope of the invention.

What is claimed is:
1. In an original document handling system for a copier with a platen cover mountable over the copying platen of a copier, which platen cover is movable toward and away from the platen, said document handling system being adapted to automatically feed a document off of the platen after it has been copied by document drive means in said platen cover, the improvement comprising:
   energy storage means connecting between said copier and said platen cover to mechanically capture and store mechanical energy obtained from said movement of said platen cover toward and away from said platen,
   said energy storage means including overload protection means for limiting the maximum mechanical energy storage therein, and
   logic control means controlling electromechanical inter-connecting means for operatively connecting said energy storage means to said document drive means to drive said document drive means for a limited period after the completion of copying of the document on said platen from said mechanical energy stored in said energy storage means obtained from said movement of said platen cover.

2. The original document handling system of claim 1, further including platen cover lifting means for automatically moving said platen cover away from said platen after said document drive means has been connected to said energy storage means, controlled by said same logic control means.

3. The original document handling system of claim 2, wherein said electro-mechanical inter-connecting means and said platen cover lifting means are commonly actuated in time sequence by a single electrical solenoid moving an actuating member in two directions wherein said actuating member moves in one said direction to actuate said inter-connecting means and then moves in the other said direction to actuate said platen cover lifting means.

4. The original document handling system of claims 1, 2, or 3, wherein said energy storage means comprises:
   spring means in said platen cover;
   spring tensioning means connecting between said spring means and said copier to tension said spring means by said movement of said platen cover relative to said platen; and
   spring retention means for accumulating and retaining said tension in said spring means independently of subsequent movement of the platen cover until said tension is released to said document drive means by said electro-mechanical inter-connecting means by said logic control means; and
   wherein said overload protection means comprises slippage means to prevent over-tensioning of said spring means.

5. The original document handling system of claims 1, 2, 3 or 4, wherein said spring means is a windable helical spring system with a releasable accumulative winding torque retention escapement, and wherein said tensioning means is a wire or cord, one end of which is windably connectable to said helical spring, and the other end of which connects to said copier and is tensioned by a lever arm connected to said platen cover.

* * * * *